United States Patent [19]

Hulderman

[11] 4,079,378
[45] Mar. 14, 1978

[54] COHERENT PULSE RADAR SYSTEM WITH TIME-SHARED FREQUENCY SOURCE

[75] Inventor: Garry N. Hulderman, Riverside, Calif.

[73] Assignee: General Dynamics Corporation, Pomona, Calif.

[21] Appl. No.: 772,624

[22] Filed: Feb. 28, 1977

[51] Int. Cl.² ............................................. G01S 7/28
[52] U.S. Cl. .............................. 343/17.1 R; 325/24; 343/7.7
[58] Field of Search .............. 325/24; 343/7.7, 17.1 R

[56] References Cited

U.S. PATENT DOCUMENTS

| 2,977,589 | 3/1961 | Gutton | 343/17.1 R |
| 3,154,782 | 10/1964 | Kagawa et al. | 343/17.1 R |
| 3,706,095 | 12/1972 | Cherwek | 343/7.7 |
| 3,790,938 | 2/1974 | Anderson et al. | 343/7.7 |

Primary Examiner—T.H. Tubbesing

[57] ABSTRACT

A coherent pulse radar system including a switching network for time sharing reference frequency signal from a reference source oscillator between a transmitter amplifier during a transmitting interval, and a local oscillator circuit during a receiving interval.

4 Claims, 2 Drawing Figures

COHERENT PULSE RADAR SYSTEM WITH TIME-SHARED FREQUENCY SOURCE

BACKGROUND OF THE INVENTION

The present invention generally pertains to radar systems and is particularly directed to an improvement in a coherent pulse radar system. Referring to FIG. 1, a typical coherent pulse radar system includes an antenna 10 for transmitting and receiving radar signals; a reference frequency source oscillator 11 for providing a signal having a given reference frequency; a transmitter amplifier 12 for amplifying the reference frequency signal to provide a transmission signal to the antenna 10 via a duplexer 13 for transmission during a transmitting interval; a local oscillator circuit 14 for responding to the reference frequency signal to provide an offset frequency signal that has a frequency that is offset from the given reference frequency; and a mixer circuit 15 for mixing the received radar signal with the offset frequency signal to provide an intermediate frequency signal on line 16 during a receiving interval.

In a coherent pulse radar system, the transmission signal and offset frequency signal track one another in frequency with a relatively low frequency difference as determined by the offset of the offset frequency signal from the reference frequency signal. This difference in frequency is obtained by generating a sideband frequency in the local oscillator 14 that is offset in frequency from the given frequency of the reference frequency signal.

The power of the reference source oscillator 11 is shared by the transmitter amplifier 12 and the local oscillator 14. Typically, a power divider 17 is employed to divide the limited available power so that 50% of the available power is provided to the transmitter amplifier and 50% is provided to local oscillator. In solid state microwave/millimeter wave coherent pulse radar systems, such power division results in diminished system performance; or it may necessitate additional amplifier stages in the transmitter amplifier 12.

SUMMARY OF THE INVENTION

The coherent pulse radar system of the present invention is characterized by a switching network for time sharing the given reference frequency signal from the source oscillator between the transmitter amplifier during the transmitting interval, and the local oscillator circuit during the receiving interval. Accordingly almost all of the power of the reference source oscillator is available to drive the transmitter amplifier during the transmitting interval, and to drive the local oscillator during the receiving interval. Thereby, increased efficiency is achieved and the number of system components may be reduced.

An additional advantage is that during the transmitting interval no power is available from the local oscillator to the mixer; which power would beat with any leakage power from the transmission signal to create a large transient in the system.

Preferably the local oscillator circuit includes a crystal controlled oscillator for providing a first signal having a frequency that is offset from the given frequency; a balanced modulator for modulating the reference frequency signal with the first signal to provide a modulated signal; and a sideband filter for filtering the modulated signal to provide the offset frequency signal that is provided to the mixer. The crystal controlled offset frequency signal assures a stable intermediate frequency signal from mixer, that is not affected by the nornmal drift problems of modulated frequency sources and the resultant necessary wideband widths which reduce the system sensitivity. This allows the bandwidth to be set to a minimum thereby permitting a matched system of highest sensitivity.

DESCRIPTION OF THE PREFERRED EMBODIMENT

Figure 1:
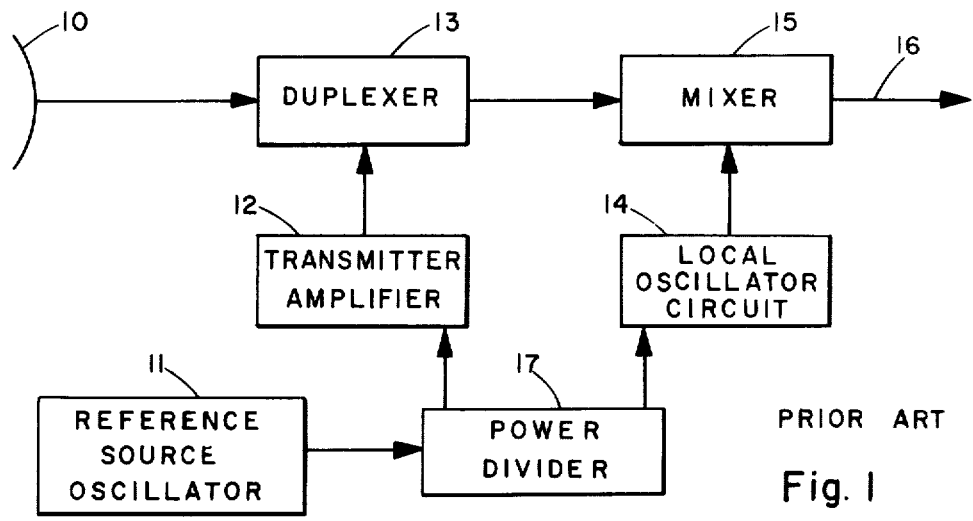
FIG. 1 is a block schematic diagram of a typical prior art coherent pulse radar system.
Figure 2:
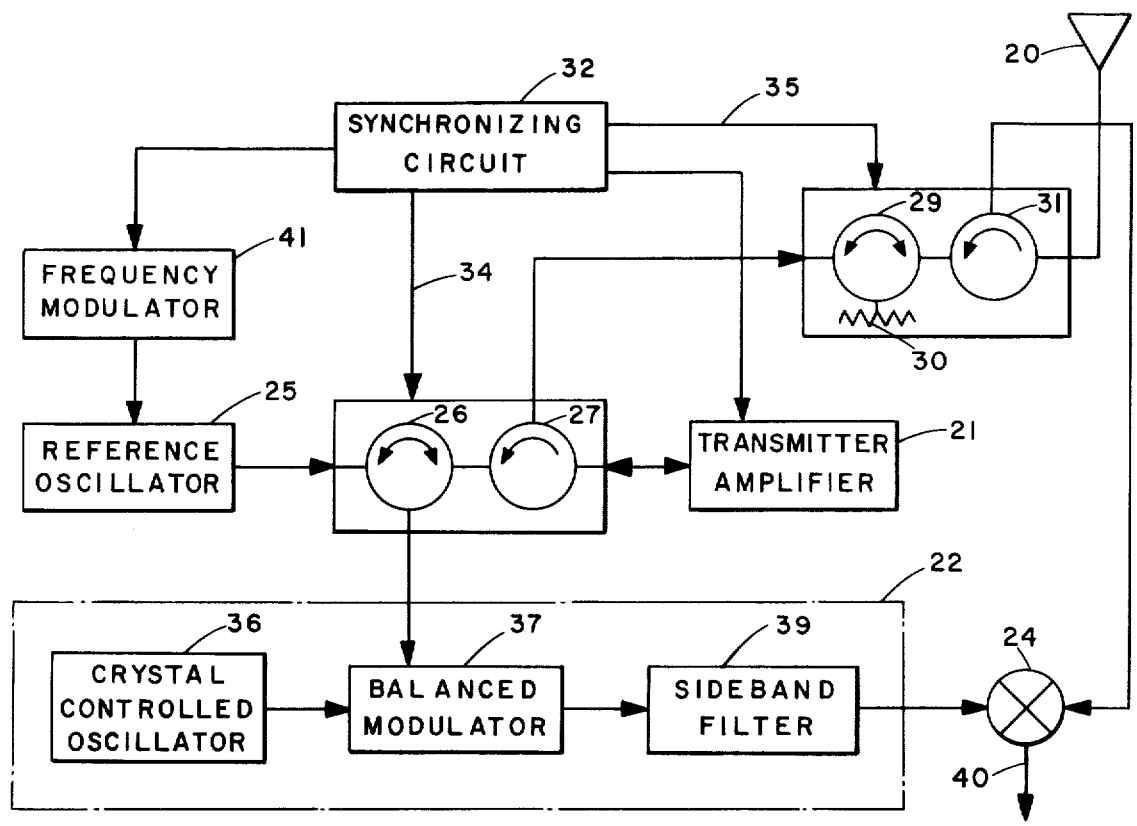
FIG. 2 is a block schematic diagram of the coherent pulse radar system of the present invention.

Referring to FIG. 2, the coherent pulse radar system of the present invention includes an antenna 20 for transmitting and receiving radar signals, a transmitter amplifier 21, a local oscillator circuit 22, a mixer 24, a reference source oscillator 25 for providing a reference frequency signal having a given reference frequency, and a switching network. The switching network includes a first three-port microwave latching switch 26 having one port coupled to the source oscillator 25, and a second port coupled to the local oscillator circuit 22; a first three-port microwave circulator 27 having one port coupled to the third port of the first latching switch 26, and a second port coupled to the transmitter amplifier 21; a second three-port microwave latching switch 29 having one port coupled to the third port of the first circulator 27, and a second port which ends in a termination 30; a second three-port microwave circulator 31 having one port coupled to the third port of the second latching switch 29, a second port coupled to the antenna 20, and a third port coupled to the mixer 24, and a synchronizing circuit 32 for controlling the direction of signal flow in the latching switches 26, 29, and for timing the operation of the transmitter amplifier 21.

In a microwave circulator, a signal entering a given port flows in a prescribed direction to the immediate next port, as indicated by the arrows depicting counter clockwise flow in circulators 27 and 31. A microwave latching switch is a modified microwave circulator in which the direction of signal flow can be controlled in accordance with the polarity of an externally controlled magnetic field, such as is applied via lines 34 and 35 from the synchronizing circuit 32 to the latching switches 26 and 29 respectively. The bidirectional arrows depicted in latching switches 26 and 29 indicate that the direction of signal flow in these switches 26 and 29 may be controlled.

The latching switches 26, 29 are ferrite switches which have inherently low insertion loss (less than 1 db) and high isolation (greater than 20 D) even in higher millimeter bands (above 100 GHz).

The local oscillator circuit 22 includes a crystal controlled oscillator 36, a balanced modulator 37 and a sideband filter 39.

During the transmitting interval the synchronizing circuit 32 controls the latching switches 26, 29 and the transmitter amplifier 21 so as to cause the reference frequency signal to flow from the reference source oscillator 25 through the first latching switch 26 and the first circulator 27 to the transmitter amplifier 21; and to also cause the transmission signal to flow from the transmitter amplifier 21 through the first circulator 27, the second latching switch 29 and the second circulator 31 to the antenna 20.

During the receiving interval the synchronizing circuit 32 controls the latching switch 26 so as to cause the given reference frequency signal to flow from the reference source oscillator 25 through the first latching switch 26 to the balanced modulator 37 in the local oscillator circuit 22, where it is modulated by a first signal from the crystal controlled oscillator 36 that is offset from the given frequency. The modulated signal from the balanced modulator 37 is filtered by a sideband filter 39 to provide an offset frequency signal to the mixer circuit 24.

During the receiving interval the synchronizing circuit also controls the latching switch 29 so as to cause the received radar signal to flow from the antenna 20 to flow through the second circulator 31 to the mixer 24, where it is mixed with the offset frequency signal to provide an intermediate frequency signal on line 40. During the receiving interval any signal that is leaked from the reference oscillator 25 through the first latching switch 26 and the first circulator 27 flows through the second latching switch 29 to the termination 30.

The preferred embodiment optionally may include a frequency modulator 41 which is coupled to the source oscillator 25 and controlled by the synchronizing circuit 32 for causing the reference frequency signal provided by the reference source oscillator 25 to be frequency modulated. Such modulation is useful in pulse compression, frequency diversity and pseudo random coding applications. This modulation can be applied to the reference source oscillator 25 during either or both of the transmitting and receiving intervals.

The present invention is particularly applicable to coherent microwave/millimeter wave pulse radar systems. In the transmitting interval, the power delivered through an exemplary Ka band time sharing switching network according to the present invention was typically more than 95%; whereas a typical prior art power divider is often required to reserve 50% of the available power for the local oscillator.

In the receiving interval, the local oscillator 22 drive power available through the exemplary Ka band time sharing switching network according to the present invention also is typically 95% of the reference source oscillator 25 power.

Having described my invention, I now claim:

1. A coherent pulse radar system comprising
   an antenna for transmitting and receiving radar signals;
   a reference frequency source oscillator for providing a signal having a given reference frequency;
   a transmitter amplifier for amplifying the reference frequency signal to provide a transmission signal for transmission from the antenna during a transmitting interval;
   a local oscillator circuit for responding to the reference frequency signal to provide an offset frequency signal that has a frequency that is offset from the given reference frequency;
   a mixer circuit for mixing the received radar signal with the offset frequency signal to provide an intermediate frequency signal during a receiving interval;
   a switching network for time sharing the reference frequency signal from thereference source oscillator between the transmitter amplifier during the transmitting interval, and the local oscillator circuit during the receiving interval, said network including
   a first three-port microwave latching switch having one port coupled to the reference source oscillator, and a second port coupled to the local oscillator circuit;
   a first three-port microwave circulator having one port coupled to the third port of the first latching switch, and a second port coupled to the transmitter amplifier;
   a second three-port microwave latching switch having one port coupled to the third port of the first circulator, and a second port that is terminated;
   a second three-port microwave circulator having one port coupled to the third port of the second latching switch, a second port coupled to the antenna, and a third port coupled to the mixer; and
   synchronizing means for controlling the direction of signal flow in the latching switches and for timing the operation of the transmitter amplifier so as to cause the reference frequency signal to flow from the source oscillator through the first latching switch and the first circulator to the transmitter amplifier during the transmitting interval; the transmission signal to flow from the transmitter amplifier through the first circulator, the second latching switch and the second circulator to the antenna during the transmitting intervals; the given reference frequency signal to flow from the source oscillator through the first latching switch to the local oscillator circuit during the receiving interval; the received radar signal to flow through the second circulator to the mixer during the receiving interval; and any signal leaked from the reference oscillator during the receiving interval through the first latching switch and the first circulator to flow through the second latching switch to the termination.

2. A radar system according to claim 1, wherein the local oscillator circuit comprises
   a crystal controlled oscillator for providing a first signal having a frequency that is offset from the given frequency;
   a balanced modulator for modulating the reference frequency signal from the reference source oscillator with the first signal to provide a modulated signal; and
   a sideband filter for filtering the modulated signal to provide the offset frequency signal to the mixer circuit.

3. A radar system according to claim 1, further comprising
   a frequency modulator coupled to the reference source oscillator and controlled by the synchronizing means for causing the reference frequency signal provided by the reference source oscillator to be frequency modulated.

4. A radar system according to claim 1, wherein the latching switches are ferrite switches.

* * * * *